United States Patent
Schuster et al.

(10) Patent No.: US 7,219,007 B2
(45) Date of Patent: May 15, 2007

(54) METHOD AND ARRANGEMENT FOR STARTING OR STOPPING A MOTOR-DRIVEN VEHICLE

(75) Inventors: Thomas Schuster, Brackenheim (DE); Werner Kind, Markgroeningen (DE); Rainer Mayer, Weil Der Stadt (DE); Thorsten Juenemann, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 495 days.

(21) Appl. No.: 10/664,943

(22) Filed: Sep. 22, 2003

(65) Prior Publication Data
US 2005/0131621 A1  Jun. 16, 2005

(30) Foreign Application Priority Data
Sep. 20, 2002 (DE) ............................ 102 43 808

(51) Int. Cl.
*F02D 45/00* (2006.01)
(52) U.S. Cl. .................... 701/112; 701/113; 123/179.4
(58) Field of Classification Search ................ 701/112, 701/110, 113, 115; 180/65.1, 65.2; 123/326, 123/325, 198 F, 198 BD, 481, 339.15, 339.19
See application file for complete search history.

(56) References Cited

U.S. PATENT DOCUMENTS

| | | | |
|---|---|---|---|
| 4,523,284 A * | 6/1985 | Amano et al. ............... | 701/115 |
| 5,091,857 A * | 2/1992 | Katayama et al. ........... | 701/112 |
| 6,275,759 B1 | 8/2001 | Nakajima et al. | |
| 6,443,126 B1 * | 9/2002 | Morimoto et al. ...... | 123/339.15 |
| 6,687,603 B2 * | 2/2004 | Wakashiro et al. .......... | 701/110 |
| 6,950,739 B2 * | 9/2005 | Matsubara et al. ......... | 701/103 |

FOREIGN PATENT DOCUMENTS

JP  2000-345878  12/2000

* cited by examiner

*Primary Examiner*—Stephen K. Cronin
*Assistant Examiner*—Johnny H. Hoang
(74) *Attorney, Agent, or Firm*—Walter Ottesen

(57) ABSTRACT

The invention relates to a method and an arrangement for starting or stopping a motor-driven motor vehicle having motor functions (1) and motor-independent vehicle functions (5) which can be used independently of the type of drive and independently of the type of motor start or motor stop. For a start operation or a stop operation, at least one command to the motor functions (1) to start or stop the motor (15) of the motor vehicle is imparted by the vehicle functions (5) via an interface (10). At least one status datum as to the motor (15) and/or the motor functions (1) is transmitted by the motor functions (1) via the interface (10) to the vehicle functions.

10 Claims, 3 Drawing Sheets

METHOD AND ARRANGEMENT FOR STARTING OR STOPPING A MOTOR-DRIVEN VEHICLE

BACKGROUND OF THE INVENTION

Ever higher demands are imposed on motor control systems of motor vehicles, for example, with respect to fuel consumption optimization when using an internal combustion engine. For such an optimization of fuel consumption, a so-called stop-start operation is already known wherein, in certain vehicle situations, the internal combustion engine is brought to standstill or is automatically restarted by the engine control. The decision when the internal combustion engine can be shut off is, on the one hand, dependent upon vehicle information non-specific to the engine such as the availability of the electrical energy for a restart and on engine-specific information, for example, whether a catalytic converter heating is active.

SUMMARY OF THE INVENTION

The method of the invention and the arrangement of the invention for starting or stopping a motor-driven motor vehicle afford the advantage compared to the above that, for a start operation or a stop operation, at least one command is issued by the vehicle functions via an interface to the engine functions for starting or stopping the engine of the motor vehicle and that at least one condition information as to the engine and/or the engine functions is transmitted from the engine functions to the vehicle functions via the interface. In this way, for a stop/start operation of the motor-driven motor vehicle, the motor functions can be unscrambled from the vehicle functions so that the method of the invention and the arrangement of the invention can be used independently of the type of motor of the motor vehicle used and also independently of the type of the realized start or stop operation. By utilizing the described interface, the vehicle functions and the motor functions with respect to start/stop operations can be distributed as desired to various control apparatuses of the motor vehicle.

It is especially advantageous when the at least one command from the vehicle functions is issued in dependence upon the at least one condition announcement from the motor functions. In this way, a defined coordination between the vehicle functions and the motor functions is possible in the start/stop operation of the motor vehicle.

It is also especially advantageous when, as at least one condition information, an information as to the start readiness or the stop readiness of the motor is used. In this way, it is made possible for the vehicle functions to check whether a command for starting or stopping the motor can be transmitted via the interface.

A further advantage is that, as at least one condition information, an information as to the motor rpm is used. In this way, the vehicle functions can check whether the motor runs automatically and a command for starting can therefore be disregarded or whether the motor does not run and therefore a command for stopping can be set aside.

A further advantage results when, as at least one condition information, an information is used that the motor runs automatically. In this way, the vehicle functions can check whether a command for starting the motor can be set aside.

A further advantage is that, as at least one condition information, an information is used as to whether the motor is running automatically. In this way, the vehicle functions can also check whether a command for starting the motor can be set aside.

A further advantage is that, as at least one condition information, an information is used whether the motor can start automatically. In this way, the vehicle functions can also check as to whether it is even purposeful to transmit a command to start the motor via the interface to the motor functions or whether the vehicle functions should not themselves have to activate a starter, which is assigned to these vehicle functions, for starting the motor.

A further advantage is that the at least one command and the at least one condition information are used independently of the type of motor of the motor vehicle and the type of start or stop operation realized. In this way, the method of the invention and the arrangement of the invention can be widely and flexibly utilized.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
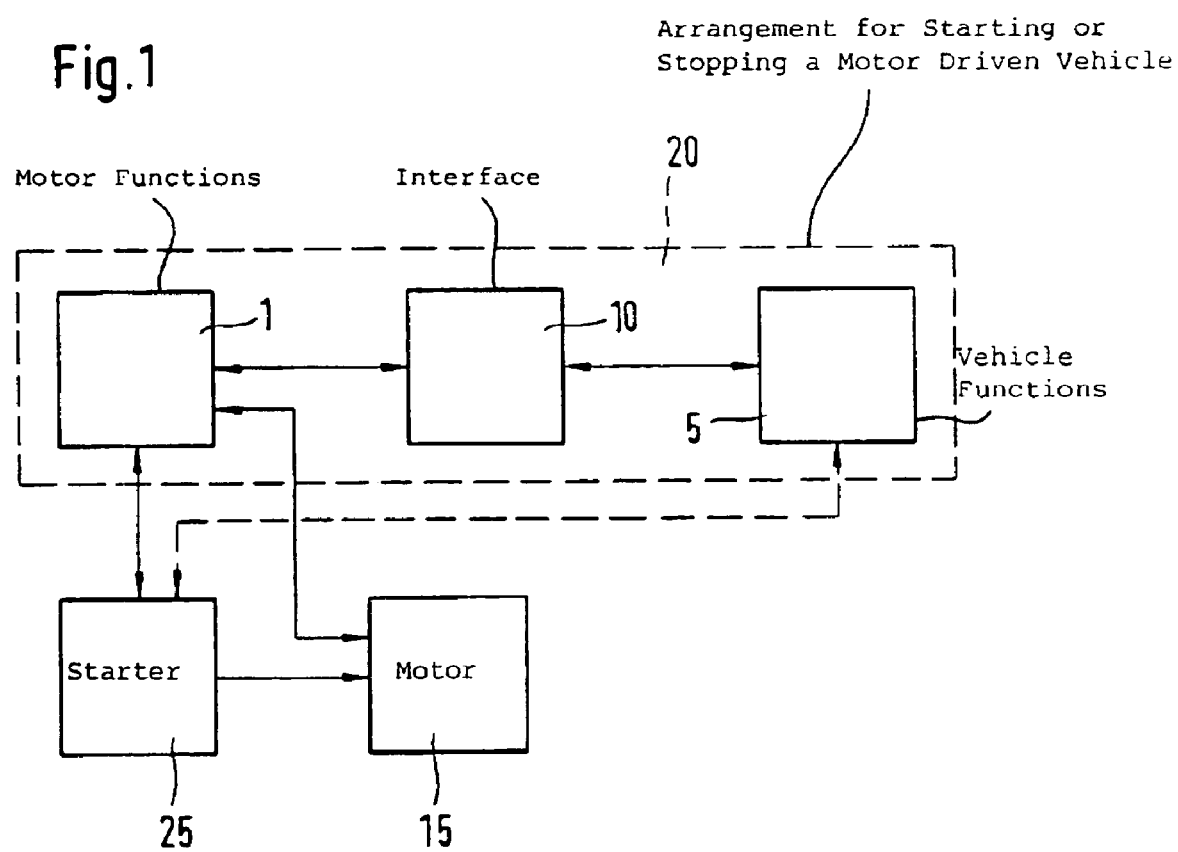
FIG. 1 is a block circuit diagram of an arrangement of the invention for starting or stopping a motor-driven motor vehicle.

In FIG. 1, reference numeral 20 identifies an arrangement for starting or stopping a motor-driven motor vehicle having motor functions 1 and motor-independent vehicle functions 5. The arrangement 20 can be integrated as hardware and/or as software in a single control apparatus, for example, a motor control apparatus of a motor vehicle or the arrangement 20 can be arranged distributed to several control apparatuses of the motor vehicle. In FIG. 1, only the functional interrelationship between the motor functions 1 and the vehicle functions 5 is shown and described hereinafter. This functional interrelationship can be realized as hardware and/or as software and need not be implemented at a particular location. The arrangement 20 can therefore be realized as hardware and/or as software and is viewed and described in the following as a functional unit. The motor functions are motor-specific functions such as in a catalytic converter heating or in an idle control. The motor-independent vehicle functions or motor-unspecific vehicle functions are functions which concern characteristics of the vehicle, for example, a driving dynamic control, a road speed control, a drive slip control, an anti-blocking system, et cetera. With respect to a stop-start operation of the motor-driven motor vehicle, the motor functions 1 check as to whether the catalytic converter heating is active. In this case, the engine should not be stopped in order not to interrupt the heating of the catalytic converter and the engine is therefore not ready for stopping. In the case of the stop/start operation, the vehicle functions 5 or the other hand check, for example, whether the electrical energy of the on-board electrical system of the motor vehicle is available for a restart. If this is not the case, then the motor should not be stopped because a restart is then not possible. The vehicle functions of the on-board electrical system signal in this case "not stop ready".

The motor functions 1 and the vehicle functions 5 are connected to each other for data communication via an interface 10. The interface 10 is likewise a component of the arrangement 20. Via the interface 10, the vehicle functions b transmit at least one command to the motor functions 1 as to the starting or stopping of the motor of the motor vehicle which is identified in FIG. 1 by reference numeral 15. In the reverse manner, at least one condition information as to the motor 15 or the motor functions is transmitted from the motor functions 1 and the interface 10 to the vehicle functions 5. The following are advantageously independent of the type of motor 15 of the motor vehicle and the type of the realized start operation or stop operation of the motor 15: the interface 10; the at least one command of the vehicle functions 5, which is transmitted via the interface 10; and, the at least one condition information of the motor functions 1 transmitted via the interface 10. The interface 10 and the data, which are transmitted via the interface 10, are therefore independent of whether the motor 15 is, for example, a spark-ignition engine with intake manifold injection, a spark-ignition engine with direct injection, a diesel engine, an electric motor or a motor based on some other alternative drive concept. Furthermore, the interface 10 and the information, which is transmitted via the interface 10, are also independent of the type of realized start operation or stop operation and are therefore, for example, independent of whether the start operation is realized via an electric motor (for example, a conventional gear reduction starter), a belt driven starter or generator, a crankshaft starter or a crankshaft generator or whether the start operation is realized via a direct start, for example, in the case of a spark-ignition engine having fuel injection. In this way, the advantage is provided that the arrangement 20 and therefore the interface 10 and the data in the form of the at least one command of the vehicle functions 5, which is transmitted via the interface 10 as well as the at least one condition information of the motor functions 1 can be especially flexibly utilized because they are not dependent on the drive concept utilized and not dependent on the start/stop concept of the motor vehicle. The unscrambling of the motor functions 1, on the one hand, and the motor-unspecific vehicle functions 5, on the other hand, via the interface 10 makes possible especially also a distribution of the vehicle control and the motor control to various control apparatus of the motor vehicle for realizing the vehicle functions 5 and the motor functions 1.

A further advantage is that a flexible use of the arrangement 20 and of the method of the invention for different hardware configurations is made possible with the use of the described interface 10 and the data transmitted via this interface. The hardware configurations are possible for realizing the stop/start operation. It is not necessary to adapt the interface 10 and the data interchange via the interface 10 to these various hardware configurations. The interface 10 and the commands or state information, which are exchanged via the interface 10, can, rather, be maintained unchanged independently of the various hardware configurations. This, too, works especially advantageously in the distribution of the vehicle control and the motor control to various control apparatus for the realization of the vehicle functions 5 and the motor functions 1. In the following, the various hardware configurations are subdivided into two categories. In both cases, a starter 25 is provided which, for example, can be driven by an electric motor and can be, for example, a conventional gear reduction motor, a belt driven starter or generator or a crankshaft starter or crankshaft generator or the like. In a first category of hardware configurations, the starter 25 is controlled by the motor functions 1 and, in a second category of the hardware configurations considered, the starter 25 is controlled by the vehicle functions 5 as shown in FIG. 1 by the broken line. For both categories, the starter 25 is connected to the motor 15 in order to start the latter. Furthermore, for both categories, the motor 15 is also controlled directly by the motor functions 1 in order to, on the one hand, inquire condition information of the motor 15 and, on the other hand, to initiate a direct start of the motor 15, for example, in the case of a spark-ignition engine having gasoline-direct injection.

In the first category of the considered hardware configurations, the start operation is controlled only by the motor functions 1 without the coaction of the vehicle functions 5 either via direct start or with the aid of the starter 25. In the case of the direct start, the motor 15 is in a position to start itself automatically, for example, via the mentioned direct start in gasoline-direct injection.

In the second category of the hardware configurations considered here, the electric motor of the starter 25 can also supply an advance torque for moving the motor vehicle outside of the start operation. In this case, the starter 25 is driven by the vehicle functions 5 in order to be able to control the output of the advance torque. For a start operation with the aid of the starter 25, the vehicle functions 5 must therefore actuate the starter 25 in order to start the motor 15 of the motor vehicle. In the event that the motor 15 of the motor vehicle can start automatically, for example, by means of a direct start in an internal combustion engine having gasoline-direct injection, then the motor functions 1 must decide whether they nevertheless require the aid of the starter 25 and must then request this aid from the vehicle functions 5 via the interface 10 with the aid of a suitable condition information.

Based on the following tables, the interface 10 of the invention between the vehicle functions 5 and the motor functions 1 is described in greater detail by way of example.

TABLE 1

| Characterization | Standard/ Optional | Description |
| --- | --- | --- |
| PTC_bEngStartOrd | S | Motor should start |
| PTC_bEngStoppOrd | S | Motor should stop |
| PTC_bEngPowSaveOrd | O | Energy save mode engaged (for example, switch off last stages) |

TABLE 2

| Characterization | Standard/ Optional | Description |
| --- | --- | --- |
| Eng_bStartEna | S | Motor-SW* is start ready |
| Eng_bStopEna | S | Motor-SW* is ready for stop |
| Eng_bRun | S | Engine runs automatically and can supply output torque |
| Eng_n | S | Motor rpm |
| Eng_errN | S | Rpm fault |

TABLE 2-continued

| Characterization | Standard/Optional | Description |
|---|---|---|
| Eng_bStartSelf | O | Motor-SW* can start motor automatically |

*Motor-SW = motor software

In Table 1, commands are listed which the vehicle functions 5 can transmit to the motor functions 1 via the interface 10. In this example, it should be assumed that the commands PTC_bEngStartOrd for the motor start and PTC_bEngStoppOrd for the motor stop are provided. Alternatively, only the command PTC_bEngStartOrd for the motor start can be provided or only the command PTC_bEngStoppOrd for the motor stop can be provided. The command PTCb_EngPowSaveOrd is provided additionally or optionally in accordance with Table 1 and this command should make possible an energy save mode in which the output stages (for example, ignition injection valve end stages) should be switched off by the motor functions 1.

In Table 2, status data are stored which are transmitted by the motor functions 1 via the interface 10 to the vehicle functions 5 in the form of acknowledgments. In this example, the status data is set forth below and is standard.

The status data Eng_bStartEna indicates whether the motor functions 1, that is, the corresponding motor software (motor-SW) of the arrangement 20 are start ready and therefore also whether the motor 15 itself is start ready. The status data Eng_bStopEna indicates whether the motor software and therefore the motor 15 is stop ready. The status data Eng_bRunEna indicates whether the motor 15 runs automatically and can supply an output torque, that is, whether the start operation is completed. The status data Eng_n indicates the motor rpm of the motor 15. The status information Eng_errN indicates whether an rpm error for the motor 15 is present. The above-mentioned status data are, in this example, provided as standard. In alternative embodiments, any desired combination of these status data can be provided as standard. Also, only one of the described status data can be provided as standard.

Additionally and optionally, the status data Eng_bStartSelf can be provided which indicates whether the motor software can start the motor 15 automatically, that is, whether a direct start of the motor 15 is possible, for example, for a spark-ignition engine having gasoline-direct injection.

Figure 3:
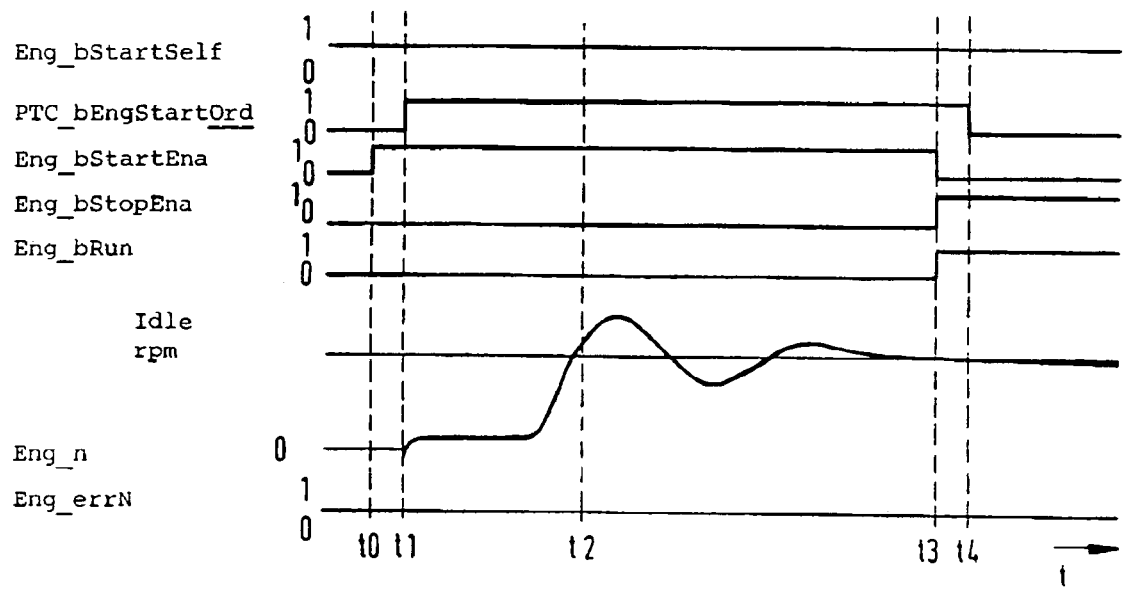
FIG. 3 is a first exemplary time-dependent trace of signals which are transmitted via an interface between the vehicle functions and the motor functions in a start operation and wherein a first hardware configuration is assumed.

In FIG. 3, a trace of the command signal PTC_bEngStartOrd is shown by way of example as well as the status data Eng_bStartSelf, Eng_bStartEna, Eng_bStoppEna, Eng_bRun, Eng_n and Eng_errN over the time t for a start operation in the first-described category of the considered hardware configurations. Except for the status datum Eng_n, which indicates the motor rpm, the remaining status data and the command PTC_bEngStartOrd for starting the motor 15 are shown as binary signals which either are set to the logic 1 or are reset to the logic 0. Before a start of the motor 15, the status datum Eng_bStartSelf is set whereas, the remaining status data and the command PTC_bEngStartOrd are reset. The status datum Eng_n for the motor rpm is likewise equal to 0. Here, it can be provided that the status data of the motor functions 1 and the commands of the vehicle functions 5 are transmitted continuously via the interface 10. At a first time point $t_0$, the motor 15 and the motor functions 1 are start ready and the status datum Eng_bStartEna is set. The datum is therefore, as described, transmitted via the interface 10 to the vehicle functions from the first time point $t_0$. In this way, it is known in the vehicle functions from the first time point $t_0$ that the motor 15 and the motor functions 1 are start ready. At a second time point $t_1$ following the first time point $t_0$, the vehicle functions 5 therefore transmit the command to start the motor 15 via the interface 10 to the motor functions 1, that is, at the second time point $t_1$, the command PTC_bEngStartOrd is set. In this way, the motor functions 1 directly control the starter 25 from the second time point $t_1$ on in accordance with a command in order to start the motor 15. The starter 25 can, for example, be a conventional reduction-gear starter. At a third time point $t_2$ following the second time point $t_1$, the motor rpm in accordance with the status datum Eng_n has exceeded the pregiven idle rpm at least, however, has exceeded a self-running limit rpm so that the motor functions 1 again switch off the starter 25 and the motor 15 settles thereafter in at the idle rpm up to a fourth time point $t_3$. In this way, the motor functions 1 detect at the fourth time point $t_3$ that the motor 15 has reached steady state, for example, in that the motor rpm lies within a pregiven tolerance range about the idle rpm and that the fluctuations of the motor rpm lie below a pregiven fluctuation band or at least the self-running limit rpm is exceeded. When this is detected at the fourth time point $t_3$ in accordance with FIG. 3, then it is determined by the motor functions at this time point that the motor 15 runs automatically and the status datum Eng_bRun is set. At the same time, the status datum Eng_bStoppEna is set at the fourth time point $t_3$ in order to indicate that the motor 15 and the motor functions 1 are stop ready. At the fourth time point $t_3$, the status datum Eng_bStartEna is also reset since the motor 15 and the motor functions 1 are now no longer start ready because the motor 15 is running in the meantime. After the vehicle functions 5 from the fourth time point $t_3$ on have been informed via the interface 10 as to the motor 15 now running automatically, especially via the status data Eng_bStartEna, Eng_bStoppEna and Eng_bRun, the vehicle functions 5 reset the command PTC_bEngStartOrd for starting the motor 15 at a fifth time point $t_4$ following the fourth time point $t_3$ and thereby take back this command.

The vehicle functions are informed that the motor 15 and the motor functions 1 are stop ready based on the status function Eng_bStoppEna starting from the fourth time point $t_3$. For this reason, the vehicle functions 5 could set the command PTC_bEngStoppOrd for stopping the motor 15 and therefore command the motor function 1 to stop the motor 15.

The status datum Eng_bStartSelf is set continuously during the time shown in FIG. 3 so that the motor 15 could have been started also automatically by means of a direct start by the motor functions 1. The reset status datum Eng_ErrN indicates that no rpm error is present in the detection of the motor rpm of the motor 15 and its indication via the status datum Eng_n. In the described example of FIG. 3 and also in the following example of FIG. 4, running times in the transmission of the status data and the commands via the interface 10 are not considered for the sake of simplicity.

Figure 4:
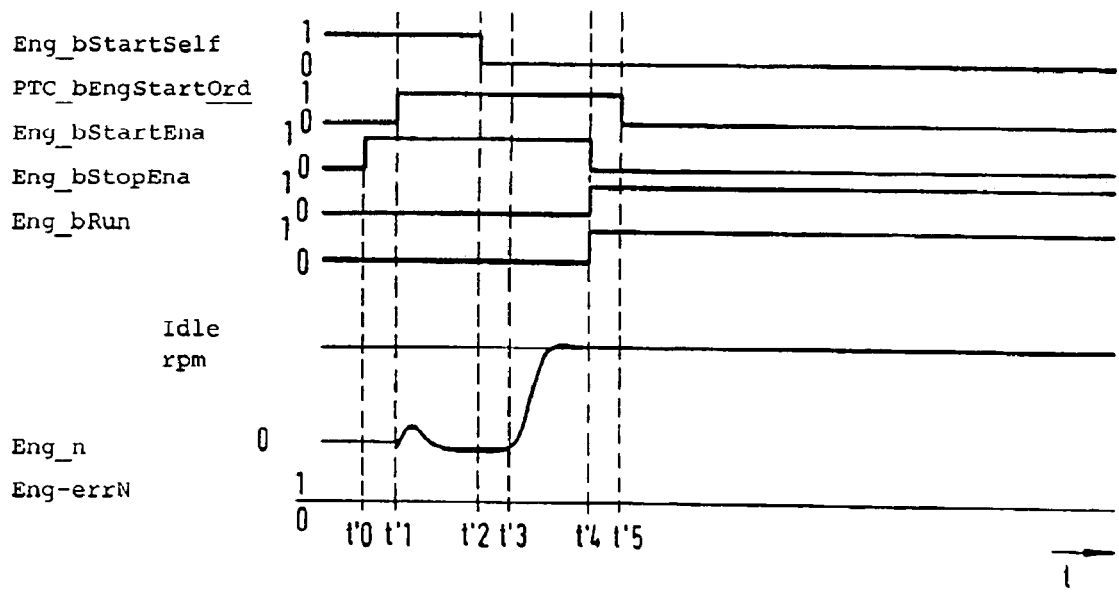
FIG. 4 is a second exemplary time-dependent trace of such a signal exchange in a start operation wherein a second hardware configuration is assumed.

In FIG. 4, the second category of the considered hardware configurations is described based on the example for the time-dependent trace of the status data already shown in FIG. 3 as well as the command PTC_bEngStartOrd shown in FIG. 3. First, all of the illustrated status data with the exception of the status datum Eng_bStartSelf are set aside in the same way as the command PTC_bEngStartOrd. At a first time point $t_0'$, the status datum Eng_bStartEna is again set and therefore the start readiness of the motor 15 and of the motor functions 1 is imparted to the vehicle functions 5. At a second time point $t_2'$, which follows the first time point $t_0'$, the command PTC_bEngStartOrd for starting the motor 15 is set by the vehicle functions 5 and the motor functions 1 are caused via the interface 10 to start the motor 15. Since the status datum Eng_bStartSelf is set at the second time point $t_2'$, the motor functions 1 attempt a direct start of the motor 15. After a pregiven time from the second time point $t_1'$ on, the motor functions 1 determine at a following third time point $t_2'$ that the motor rpm is approximately 0 in accordance with the status datum Eng_n as it was before the first time point $t_0'$. Ath the third time point $t_2'$, the motor functions 1 therefore detect that the attempt at direct start of the motor 15 failed. For this reason, at the third time point $t_2'$, the status datum Eng_bStartSelf is reset and the vehicle functions 5 are informed that the motor 15 cannot be started by the motor functions 1. Thereupon, the vehicle functions 5 cause the starter 25, at a following fourth time point $t_3'$, to start the motor 15. The starter 25 can, for example, be configured as a crankshaft starter or crankshaft generator. At a fifth time point $t_3'$ following the fourth time point $t_3$, the motor rpm settles at idle rpm in accordance with the status datum Eng_n so that the status data Eng_bRun and Eng_b-StoppEna are set and the status datum Eng_bStartEna is reset as was the case also in the example of FIG. 3 at the fourth time point $t_3$ for the detection of the automatically running motor 15. Accordingly, and in the same manner as in the example of FIG. 3, the command PTC_bEngStartOrd is reset by the vehicle function 5 at a sixth time point $t_5'$ following the fifth time point $t_4'$. For stopping the motor at steady state, the command PTC_bEngStoppOrd for stopping the motor 15 could then thereafter be set by the vehicle functions 5. This command is not shown in FIG. 4. In the example of FIG. 4, the vehicle functions 5 can again switch off the starter 25 at the fifth time point $t_4'$ because the motor 15 then runs automatically.

Figure 2:
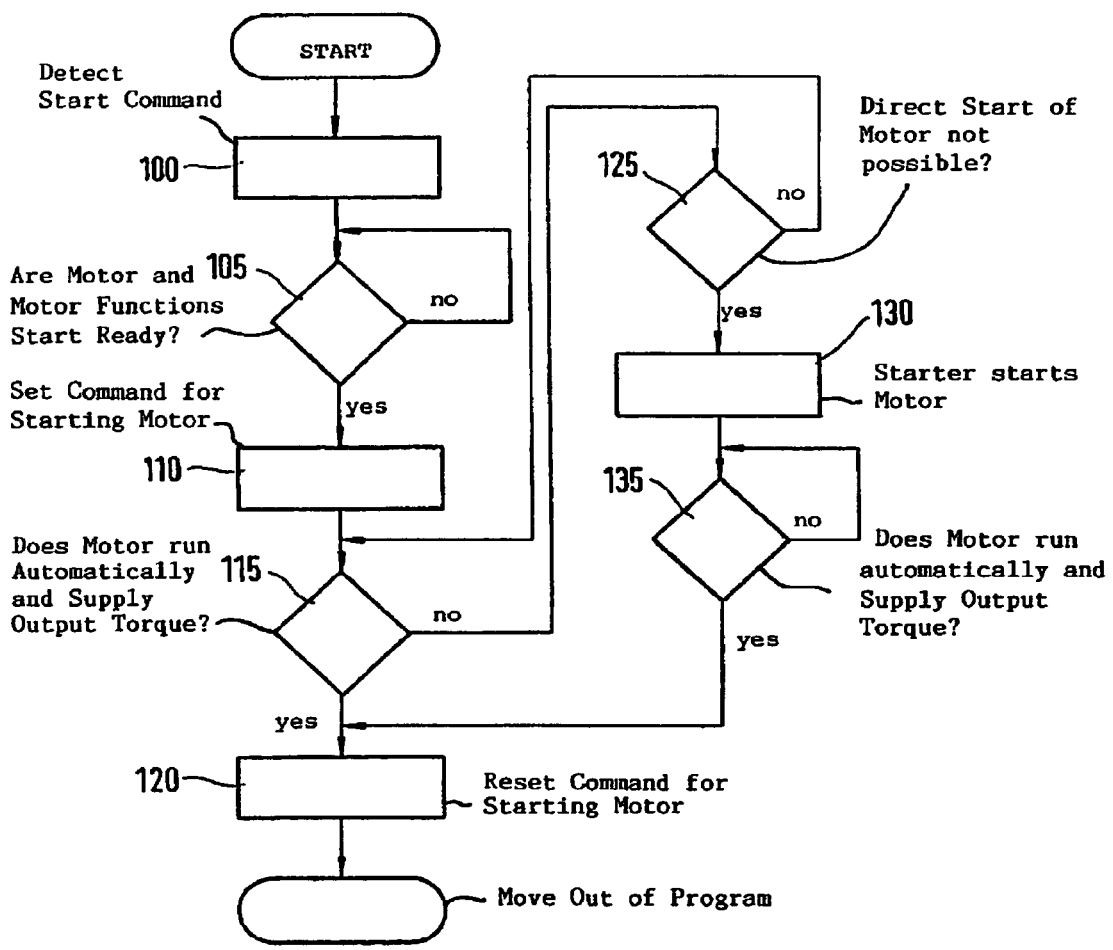
FIG. 2 is a sequence diagram for explaining the method of the invention for starting or stopping a motor-driven motor vehicle.

The method of the invention is now again explained with respect to the sequence diagram of FIG. 2. This sequence diagram can be used independently of the hardware configuration utilized. The sequence plan of FIG. 2 is provided by way of example for a motor start. After the start of the program, a start command is detected by the vehicle functions 5 at program point 100. Thereafter, the program branches to program point 105. At program point 105, the vehicle functions check as to whether the status datum Eng_bStartEna is set which has been transmitted via the interface 10, that is, whether the motor 15 and the motor functions 1 are start ready. If this is the case, then the program branches to program point 110; otherwise, the program branches back to program point 105.

At program point 110, the vehicle functions 5 set the command PTC_bEngStartOrd for starting the motor 15 which is transmitted to the motor functions 1 via the interface 10. Thereafter, the program branches to program point 115.

At program point 115, the vehicle functions 5 check as to whether the status datum Eng_bRun is set, that is, whether the motor 15 runs automatically and can supply an output torque. The status datum Eng_bRun is transmitted by the motor functions 1 via the interface 10. If the above is the case, then the program branches to program point 120; otherwise, the program branches to program point 125.

At program point 120, the vehicle functions 5 reset the command PTC_bEngStartOrd for starting the motor 15 so that no command for starting the motor 15 is transmitted to the motor functions 1 via the interface 10. Thereafter, there is a movement: out of the program.

At program point 125, the vehicle functions 5 check whether the status datum Eng_bStartSelf, which is transmitted by the motor functions 1 via the interface 10, is set, chat is, a direct start of the motor 15 was not possible and the motor 15 cannot be started by the motor functions 1. If this is the case, then the program branches to program point 130; otherwise, the program branches to program point 115.

At program point 130, the vehicle functions 5 cause the starter 25 to start the motor 15. The starter 25 can, for example, be configured as a crankshaft starter or crankshaft generator as described. Thereafter, the program branches to program point 135.

At program point 135, the vehicle functions 5 check as to whether the status datum Eng_bRun was set, that is, whether the motor 15 runs automatically and can supply an output torque. The status datum Eng_bRun is transmitted by the motor functions 1 via the interface 10. If the above is the case, then the program branches to program point 120; otherwise, the program branches back to program point 135.

The program of FIG. 2 can be run through as often as desired. As described, the program is independent of the hardware configuration used or even independent of the category of the hardware configuration used. For the sequence of the program of FIG. 2, it is of no consequence whether the motor functions 1 attempt a direct start of the motor 15 or whether they start the motor 15 by means of, the starter 25. Only for the case that the vehicle functions 5 detected that the status datum Eng_bStartSelf is reset, do the vehicle functions 5 detect that the motor functions 1 cannot themselves start the motor 15 either directly nor via the starter 25. In this case, and according to the second category for the described hardware configurations, the motor 15 is started by the vehicle functions 5 via the starter 25.

According to the embodiments described, it can be provided that the command PTC_bEngStartOrd is only set when, first, based on the status datum Eng_bStartEna, it was detected that the motor 15 and the motor functions 1 are start ready.

The procedure for a motor stop is comparatively simpler. When the vehicle functions 5 have detected that the motor functions 1 and the motor 15 are stop ready based on the status datum Eng_bStopEna transmitted by the motor functions 1 via the interface, then the vehicle functions 5 can set the command PTC_Eng_StoppOrd in order to command the motor functions 1 via the interface 10 to stop the motor 15. Thereupon, the motor functions 1 cause the motor 15 to directly stop the motor, for example, by switching off the fuel metering. Thereafter, a check is made by the motor functions as to whether the motor rpm Eng_n has returned to 0. If this is the case, then the status datum Eng_bStopEna is reset and the status datum Eng_bStartEna is again set in order to transmit to the vehicle functions via the interface 10 that the motor functions 1 and the motor 15 are again start ready. If the motor standstill was detected after the motor stopped, that is, the rpm Eng_n has returned to 0, the status datum Eng_bRun can be again reset in order to advise the vehicle functions 5 via the interface 10 that the motor 15 no longer runs. Furthermore, after detection of standstill of the motor 15 after the motor stop, the status datum Eng_bStartSelf can also again be set in order to permit the possibility of a direct start with a renewed motor start.

It is understood that the foregoing description is that of the preferred embodiments of the invention and that various changes and modifications may be made thereto without departing from the spirit and scope of the invention as defined in the appended claims.

What is claimed is:

1. A method for starting or stopping a motor-driven motor vehicle having motor functions and vehicle functions independent of the motor, the method comprising the steps of:
- for a start operation or a stop operation, issuing at least one command by said vehicle functions via an interface to said motor functions for starting or stopping the motor of said motor vehicle; and,
- transmitting at least one condition datum as to said motor and/or said motor functions by said motor functions via said interface to said vehicle functions.

2. The method of claim 1, wherein said command is issued by said vehicle functions in dependence upon said at least one condition datum of said motor functions.

3. The method of claim 1, wherein said command is used as a request for starting or stopping the motor of said motor vehicle.

4. The method of claim 1, wherein a datum as to the start readiness or stop readiness of said motor is used as said at least one condition datum.

5. The method of claim 1, wherein a datum as to the motor rpm is used as said at least one condition datum.

6. The method of claim 1, wherein a datum as to whether the motor runs automatically is used as said at least one condition datum.

7. The method of claim 1, wherein a datum as to whether said motor can start automatically is used as said at least one condition datum.

8. The method of claim 1, wherein said motor is a particular type of motor and said at least one command and said at least one condition datum are realized independently of the type of said motor of said vehicle and the type of start or stop operation.

9. An arrangement for starting or stopping a motor-driven motor vehicle having motor functions and vehicle functions independent of the motor, the arrangement comprising:
- an interface;
- for a start operation or a stop operation, means for issuing at least one command by said vehicle functions via said interface to said motor functions for starting or stopping the motor of said motor vehicle; and,
- means for transmitting at least one condition datum as to said motor and/or said motor functions by said motor functions via said interface to said vehicle functions.

10. The arrangement of claim 9, wherein said motor is a particular type of motor and said at least one command and said at least one condition datum are realized independently of the type of said motor of said vehicle and the type of start or stop operation.

* * * * *